Dec. 29, 1936.  T. H. OPPENHEIM  2,065,868
WINGED SWINGING BAFFLE FOR CORN HUSKERS AND SHREDDERS
Filed May 21, 1935  2 Sheets-Sheet 1

Inventor
T. H. Oppenheim.
By Lacey & Lacey,
Attorneys

Dec. 29, 1936.   T. H. OPPENHEIM   2,065,868
WINGED SWINGING BAFFLE FOR CORN HUSKERS AND SHREDDERS
Filed May 21, 1935    2 Sheets-Sheet 2

Inventor
T. H. Oppenheim.
By Lacey & Lacey,
Attorney

Patented Dec. 29, 1936

2,065,868

UNITED STATES PATENT OFFICE 2,065,868

WINGED SWINGING BAFFLE FOR CORN HUSKERS AND SHREDDERS

Theodore H. Oppenheim, Coldwater, Ohio, assignor to The New Idea Spreader Company, Coldwater, Ohio, a corporation of Ohio Application May 21, 1935, Serial No. 22,663

6 Claims. (Cl. 209—24)

This invention relates to an improved corn husker shredder and more particularly to an improvement in the construction and mounting of the shaker frame and baffle. At the present time, a husker shredder has its shaker frame mounted for longitudinal reciprocating movement by hangers spaced from each other longitudinally thereof and a baffle which may be referred to as an end wall or gate for the shaker is mounted adjacent one end of the shaker for guiding the husks and stover into an exhauster or blower. This construction has been found unsatisfactory as the baffle is stationary and causes considerable wear upon the reciprocating shaker. It has also been found that when the baffle or gate is stationary and the shaker moves relative to it, husks or stover are liable to become caught between the shaker and the baffle and interfere with free movement of material into the exhauster. Attempts have been made to overcome the objections noted above by providing the baffle with a skirt at its lower end of leather, or other flexible material, but this has not proved satisfactory as the husks still have a tendency to become caught between the shaker and the baffle and also are liable to force their way under the leather skirt.

Therefore, one object of the invention is to provide a corn husker shredder with an improved arrangement of shaker and baffle, the baffle or back not only serving its function of directing husks and stover effectively into the blower but also constituting a swinging hanger for one end portion of the shaker and causing the two to move together when the shaker is reciprocated and eliminate wear upon the baffle and shaker and also likelihood of husks becoming jammed and interfering with proper operation of the shaker.

Another object of the invention is the provision of a swinging baffle which serves the purpose of a hanger for one end of the shaker and thus eliminates use of separate hangers for one end portion of the shaker frame and also reduces the number of parts and the cost of manufacture.

Another object of the invention is the provision of a baffle which, due to its movement with the shaker frame, will be shifted partly across the entrance opening of the blower toward and away from the stower or screw conveyor of the blower and materially assist in the free movement of husks and stover into the blower or exhauster by the conveyor.

The invention is illustrated in the accompanying drawings, wherein

Figure 3 is a fragmentary sectional view taken longitudinally of the shaker frame and showing the swinging baffle in vertical section.

Figure 1:
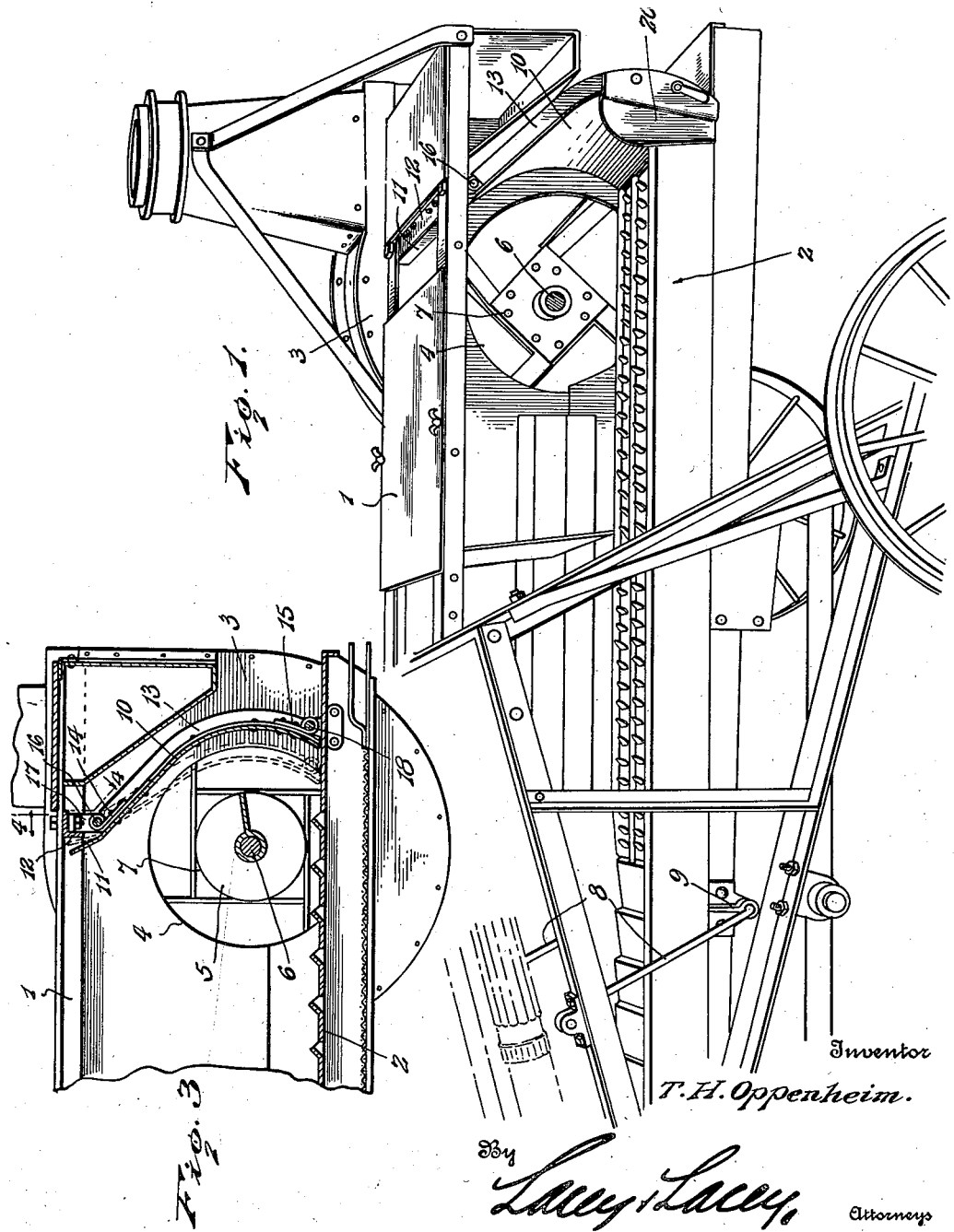
Figure 1 is a fragmentary view in perspective of a husker shredder showing its shaker frame mounted at one end by a swinging baffle.
Figure 2:
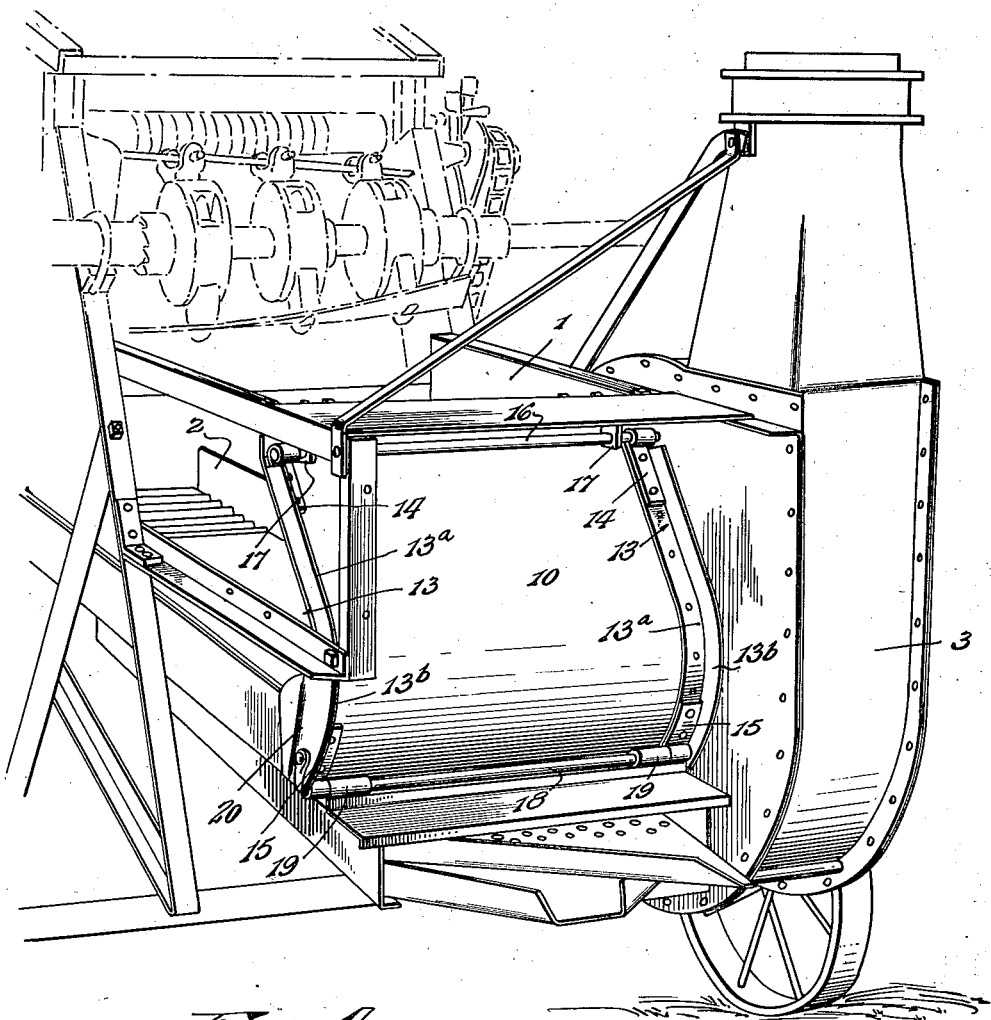
Figure 2 is a perspective view of the improved husker shredder looking in a direction opposite to that of Figure 1.
Figure 4:
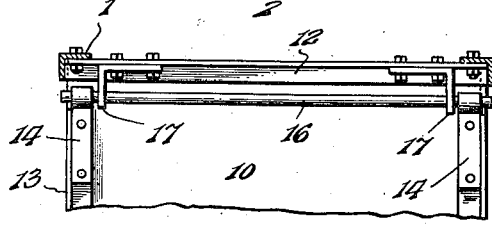
Figure 4 is a fragmentary sectional view taken along the line 4—4 of Figure 3.

The husker shredder, which is indicated by the numeral 1, is, in most respects, of a conventional construction and includes a shaker 2, one end of which extends along the inner side of a blower 3 into which husks and stover are fed through a side opening 4 by a screw conveyor 5 carried by the shaft 6 which extends into the blower axially of the opening 4 and within the blower carries a fan 7 of the usual construction. In husker shredders of a conventional construction the shaker is supported for longitudinal reciprocating movement by sets of hangers 8 which are spaced from each other longitudinally of the shaker with their upper ends pivoted to the frame of the machine and their lower ends pivotally engaged in sockets 9 at opposite sides of the shaker. In the present construction the hangers previously provided at the rear end of the shaker have been omitted and an improved construction and arrangement of parts substituted. According to this invention, a back or baffle 10, which may be referred to as a gate, extends vertically at the back of the shaker and extends upwardly therefrom at a forward incline. This baffle is formed from sheet metal of the proper thickness and has its lower portion curved, as clearly shown in Figure 3, and its upper portion bent to provide a lip 11 disposed in front of a cross beam 12 of the frame. Strips of angle metal 13 are secured along side edge portions of the baffle with their flanges 13ª secured against the sheet metal plate by rivets or in any desired manner. Bearing brackets 14 and 15 are riveted upon end portions of the flanges 13ª, or the portions of the strips of angle metal forming these flanges 13ª may be extended and folded back upon themselves and secured to form the bearings. The upper bearings 14 carry a shaft 16 which extends through bearing brackets 17 carried by and depending from the cross bar 12 and, therefore, the baffle will be hingedly mounted at its upper end for swinging movement longitudinally of the machine. A shaft 18 extends through bearing brackets 19 carried by the shaker frame and end portions of this shaft are engaged in the bearings 15 so that the lower end of the baffle will be pivoted to the shaker. In view of the fact that lower end portions of the flanges 13$^b$ overlap outer ends of the bearings 15, the shaft 18 will be held in place and prevented from slipping out of the bearings 15 and 19. Therefore, the shaker cannot become detached from the swinging baffle. A side plate or wing 20 is secured against the lower portion of the outer flange 13$^b$ of the angle iron so that it moves back and forth with the swinging back and overlaps the outer side bar of the shaker frame with a portion of this plate or wing extending upwardly above the shaker frame. It will thus be seen that husks which may have a tendency to accumulate at this end of the shaker frame will be engaged by the wing or plate 20 and prevented from dropping off of the shaker at its outer side.

When this improved husker shredder is in operation, the shaker is reciprocated in the usual manner and during this reciprocating movement, husks will be moved along the shaker toward the rear end thereof. Upon reaching the rear end of the shaker, the husks will encounter the screw conveyor 5 which extends transversely across the shaker and the screw conveyor will move the husks through the opening 4 into the blower. The back or baffle swings longitudinally of the machine when the shaker is in motion and will move from the position shown in Figure 1 in which it is located, a short distance rearwardly of the opening 4 to a position in which it partially overlies the opening and then return to its rearward position. It will thus be seen that the swinging back or baffle moves toward and away from the screw conveyor during reciprocation of the shaker and, therefore, any husks and stover which pass under the screw conveyor will be intermittently moved toward the conveyor so that they may be taken up by the conveyor and carried into the blower. As the baffle moves with the shaker, the shaker will not have reciprocating movement under the baffle and, therefore, undue wear will be eliminated and also there will be no danger of husks and stalks becoming jammed between the shaker and baffle and interfering with operation of the machine. It will thus be seen that by having the rear end portion of the shaker pivotally connected with a baffle which has its upper end pivoted to the frame of the machine, the husks will be very effectively delivered into the blower and the use of a separate hanger to swingingly support this end portion of the shaker will be eliminated.

Having thus described the invention, what is claimed as new is:

1. In a machine of the character described, a blower having an entrance, a shaker having one end portion extending across the entrance opening, and a baffle disposed vertically with its upper end movably connected with the frame of the machine and its lower end movably connected with the shaker, said baffle serving as a movable support for the shaker and moving longitudinally therewith from a position rearwardly of the entrance opening of the blower to a position in overlying relation to a portion of the entrance opening.

2. In a machine of the character described, a frame, a shaker mounted for longitudinal reciprocating movement, a blower at one side of the shaker having an entrance presented toward the shaker, a fan for the blower, and a swinging baffle consisting of a plate extending vertically over the shaker with its lower portion curved vertically and its upper portion bent to form a lip disposed in front of a cross bar of the frame, bars secured along side edge portions of the plate, bearings at the upper and lower ends of said bars, depending bearings carried by the cross bar, a shaft engaged through the depending bearings and the bearings at the upper end of said plate to movably mount the plate at its upper end for swinging movement longitudinally of the frame, bearings carried by said shaker, a shaft engaged through the lower bearings of the plate and the bearings of the shaker to movably connect the plate with the shaker whereby the baffle may serve as a swinging support for the shaker, and a plate secured at one side of the baffle and constituting a wing extending in overlying relation to a side of the shaker in front of the baffle.

3. In a machine of the character described, a reciprocating shaker, a blower having an entrance presented toward the shaker at one side thereof, and a baffle for limiting movement of material along the shaker disposed transversely of the shaker and extending upwardly from the shaker with its lower end movably connected to the shaker and its upper end movably connected to the frame of the machine whereby the baffle may serve as a swinging support for the rear end portion of the shaker and move with the shaker from a position in spaced relation to the entrance of the blower to a position in overlying relation to a portion of the entrance.

4. In a machine of the character described, a reciprocating shaker, a blower at one side of the shaker having an entrance facing the same, a conveyor extending transversely across the shaker adjacent one end thereof for delivering material from the shaker into the blower, and a baffle plate having its upper and lower ends movably connected to the frame of the machine and to the said end of said shaker whereby the back plate serves as a swinging support for the shaker and has movement with the shaker towards and away from the conveyor transversely thereof for urging material between the baffle and conveyor towards the conveyor.

5. In a machine of the character described, a shaker, a blower for receiving material from the shaker, a conveyor for delivering material from the shaker to said blower, and a baffle for directing material from the shaker into the blower disposed transversely of the shaker and serving as a swinging support for the shaker and moving with the shaker towards and away from the conveyor for urging material between the conveyor and baffle towards the conveyor whereby the said material will be carried by the conveyor to the blower.

6. A machine of the character described including a reciprocating shaker, a blower at one side of said shaker having an entrance facing the shaker, and a back serving as a swinging support for the shaker and having a side wing extending forwardly from the back and overlapping the shaker longitudinally thereof at the other side of the shaker from said blower.

THEODORE H. OPPENHEIM.